(12) United States Patent
Eckstein (10) Patent No.: US 7,450,119 B2
(45) Date of Patent: Nov. 11, 2008

(54) METHOD AND SYSTEM FOR DEVELOPING IMAGE PROCESSING APPLICATIONS

(75) Inventor: Wolfgang Eckstein, Oberschleissheim (DE)

(73) Assignee: MVTEC Software GmbH, Munich (DE)

( * ) Notice: Subject to any disclaimer, the term of this patent is extended or adjusted under 35 U.S.C. 154(b) by 274 days.

(21) Appl. No.: 10/220,940

(22) PCT Filed: Mar. 6, 2001

(86) PCT No.: PCT/EP01/02507

§ 371 (c)(1),
(2), (4) Date: Sep. 5, 2002

(87) PCT Pub. No.: WO01/67389

PCT Pub. Date: Sep. 13, 2001

(65) Prior Publication Data
US 2003/0039392 A1    Feb. 27, 2003

(30) Foreign Application Priority Data
Mar. 8, 2000    (EP) ................................. 00104933

(51) Int. Cl.
*G06T 15/00* (2006.01)
(52) U.S. Cl. .................... 345/420; 700/83; 700/86; 706/45; 706/50
(58) Field of Classification Search .............. 345/420; 700/83, 86; 706/45, 46, 47, 50
See application file for complete search history.

(56) References Cited

U.S. PATENT DOCUMENTS

| | | | |
|---|---|---|---|
| 5,742,504 A | 4/1998 | Meyer et al. ............... 700/83 |
| 5,940,296 A | 8/1999 | Meyer ....................... 364/188 |
| 5,950,182 A | 9/1999 | Godbole et al. ............ 700/83 |
| 6,226,783 B1* | 5/2001 | Limondin et al. ......... 717/104 |
| 6,256,625 B1* | 7/2001 | Breyer et al. ................ 707/3 |
| 6,389,587 B1* | 5/2002 | Lewis ....................... 717/151 |
| 6,522,346 B1* | 2/2003 | Meyer ....................... 715/771 |
| 6,611,735 B1* | 8/2003 | Henly et al. .............. 700/266 |
| 6,931,602 B1* | 8/2005 | Silver et al. .............. 715/771 |
| 7,051,317 B2* | 5/2006 | Vazquez et al. ........... 717/104 |

OTHER PUBLICATIONS

Clouard et al., BORG: A Knowledge-Based System for Automation of Image segmentation Tasks, Image processing and Application, IEEE, Jul. 1995, pp. 524-528.*
Khoros, Chapter 1, Introduction, pp. 1.1-1.3; Jun. 1995.*
Int'l Search Report, Jun. 3, 2001.
Clouard R et al, "BORG: A Knowledge-Based System for Automatic Generation of Image Processing Programs", Feb. 1999, 128-144.

(Continued)

*Primary Examiner*—Phu K Nguyen
(74) *Attorney, Agent, or Firm*—Abelman, Frayne & Schwab (57) ABSTRACT

The described method relates to the delelopment of image processing applications. In order to facilitate the development of image processing applications the described method provides a plurality of image processing components (1 to 10) and a connector means (11) for establishing connections between components selected from said plurality of components by a user, wherein the connector means (11) automatically connects said selected components. In particular, the automatic connection of the selected components is based on information provided by the respective components.

23 Claims, 6 Drawing Sheets

OTHER PUBLICATIONS

Toriu T et al, "An Expert System for Image Processing", Jun. 21, 1987, 111-118.

König et al, "A Generic Dynamic Inspection System for Visual Object Inspection and Industrial Quality Control", Oct. 25, 1993, 1243-1246.

Eckstein et al., "Architecture for Computer Vision Application Development With the Horus System", Apr. 1997, 244-261.

Office Action issued for the corresponding European patent application No. 01 90 9821.9 dated May 22, 2006.

* cited by examiner

METHOD AND SYSTEM FOR DEVELOPING IMAGE PROCESSING APPLICATIONS

The present invention relates to a method and a system for developing image processing applications and a computer readable program product for performing such a method.

Standard approaches for the development of image processing applications and basic information thereon can, for example, be found in "Visual Basic 6.0 Programmer's Guide", Microsoft Press, and in U.S. Pat. No. 5,742,504 describing a method and a system for quickly developing application software for use in a machine vision system.

The following features are common to standard approaches known in the art. Known systems use components (e.g., ActiveX), which solve specific sub problems (e.g., image grabbing, or blob analysis), and combine the components to build the application (design mode). Furthermore, adapting the components and their graphical user interface (design mode) is common to known systems. The state of the components, i.e., the things that have been changed in the design mode.

However, the following limitations are related with these prior art systems. Each component of the prior art systems has at most one graphical user interface. Furthermore, in known systems two modes are distinguished: design mode and user mode. In design mode, the components are selected, the program is written, and the state of the features is modified. The user mode corresponds to the final application (executable). The state of the design mode and the state of the user mode can be saved. However, this is done with two independent and incompatible mechanisms. This means, for example, that changes made in the user mode cannot be accessed in design mode. Furthermore, the state of the design mode cannot be changed once the application is generated because it is compiled into the application. Moreover, in design mode, only one component can be executed. Finally, only predefined data structures are used in known systems.

A typical problem with existing systems that are based on object components is the need for programming. The user must add code to connect the selected components, to specify the control flow, and to connect data sources like images and regions of interest to the processing components. In this context, reference is made to U.S. Pat. No. 5,742,504. However, many users, whose principal goal is to develop an image processing application, do not have sufficient programming knowledge to accomplish the required programming task easily, quickly, and without programming errors.

It is the object of the present invention to ease the task of application development. This object is solved with the features of the claims.

It is an advantage of the present invention that the need for programming, the specification of component relations, the specification of execution order, and the need to store the program status by the user are eliminated. According to the invention, all these tasks are determined automatically without any additional task that the user must perform. The invention is based on components which can be selected by the user. Components are objects in the terminology of object oriented programming. The selection of components is done according to the requirements of the application, i.e., the user selects those subtasks that fulfill the requirements. Triggered by this selection, according to the invention, the components automatically generate the application. The user only needs to configure the look and feel of the graphical user interface and to specify the image processing parameters. By this, programming is completely eliminated from application development. Furthermore, the time needed to develop an application is greatly reduced.

According to the present invention as set forth in claim 1, a connector means is provided for automatically converting selected components with each other. In accordance with a preferred embodiment as specified in claim 2, said selected components are—in a preceding step—also automatically connected to said connector means. It is to be noted that the preferred embodiments of claims 15, 16, and 18 to 20 are not limited to the embodiment of claim 2.

According to a preferred embodiment of the present invention, a connector means is provided for automatic connection of the components. Whenever a component is added to or removed from the application it calls the connector means. In the case of adding it to the application, it will be registered, which makes it known and accessible for the application, i.e., it becomes part of the application. By removing it from the application, it will be unregistered and can no longer be used. The adding of a component can be done by the user, for example, by double clicking the icon of the component, and therefore placing it on a "form". It can also be invoked internally by other components by calling a generation operation. Removing a component can similarly be done by the user by deleting the component from the form, or by other components by calling a delete operation of the component.

The generation of the connections is realized by a special set of methods and data structures. In the following, this set of data together with the corresponding methods is called connector. The connector can, for example, be implemented as a class that generates one instance when it is used. Each component has access to the connector. This can be implemented by linking (in the sense of compiler terminology) the connector to each component. When the connector is activated for the first time—during a particular session—it initializes its data structures, and loads additional information for the connection process, if available. Further activations of the connector, during a particular session, will not re-initialize it, but extend or modify its status. The connector holds references to all registered components. Besides this, it holds all connections between the components and all the information (for execution, communication, the load/save mechanism, etc.) derived from this.

The connector divides the registered components into two groups: Those that can be connected correctly to other components, and those that cannot be connected. The case that a component cannot be connected arises, for example, if the user selects only part of the components that are required for a meaningful application.

One example for this is if the user selects an image processing component but no component that provides the image data. Because there are no restrictions to the order of selecting components this case will frequently happen when setting up a new application.

After the design or user mode ends, the connector will be unloaded. Before the connector is unloaded, it can save information about the current components and their connections. This information can be used when the application is invoked the next time, either in design or user mode.

Now, the addition of a component to the image processing application is described. When a component is added to an application by the user, for example by double-clicking its icon, an initialization method of the component is executed. During this initialization, the registration method of the connector is called. By calling this method, a reference or pointer to the component and/or its description is passed to the connector. Based on this information, the connection process will be accomplished.

When registering a component two cases have to be distinguished. If it is possible to connect the new component to the components of the application, the necessary connections are configured and the component becomes part of the application. The integration of the new component can require a reconfiguration of the connections established so far. After the integration of the new component, the list of not yet connected components is revised. This means that for each component of this list the registration process is executed anew (with the exception that in the case it still cannot be connected it will not be added to the list again). In the case that a component cannot be connected to other components, it is put into the list of not (yet) connected components.

Connecting a component comprises, but is not limited to, that a component can have (i) a reference, pointer, or a similar mechanism to its predecessors, i.e., the components which provides input data, (ii) a reference, pointer, or a similar mechanism to its successors, i.e., the components which accept the output data for further processing, (iii) a reference, pointer, or a similar mechanism to a viewer, that can display its results, (iv) a reference, pointer, or a similar mechanism to a component, that controls components, (v) a reference, pointer, or a similar mechanism to the scheduler, that accesses all components.

According to the invention, after a component is added to the application, and the connections are established, it can immediately be executed, even if the system is in design mode. This is possible, because each component can call any other component via the connector or directly. By this, the whole application can be executed, even if there are no callbacks supported by the programming environments, and only the interface of one component needs to be active at a time (like, e.g., in Microsoft Visual Basic).

At any time the connector can inform the user about the consistency of the application so far. Examples for this are, for example, that components could not be connected or that important components are missing.

It will now be described how components are connected.

The problem of connecting the components can be solved by using different methods, some of which are based on optimization, informed search, and heuristic search. The algorithm used in the preferred embodiment of the invention is a stepwise elimination of ambiguities until definite connections can be assigned. The algorithm is based on, but not limited to, the proposed categories of components. The algorithm described in the following assumes, that no previous information about the specific application is available, i.e., the user generates a new application.

If a component selected by a user is the first to be registered or if there are no components that form part of the application so far, the component is tested if it is a data source (input component) or not. In the case of an input component, it is used as the initial part of the application, having no connections so far. Otherwise, the component is put into the list of not connected components. However, if there are already components in the application, the following method is executed.

As a first step, each input and output parameter of the selected component, which has to be connected to the other components, is checked with all available parameters of the components of the application, according to a set of evaluation rules. If a connection fulfills the rules, it will be added to a candidate connection list. By using further rules, the amount of possible connections will be reduced until an unambiguous decision can be made or the process stops. In the candidate connection list, the parameters of already connected components are included. The reason for this is that the new component can, for example, be inserted into a sequence of already connected components. An example for this is a blob analysis, calculating numerical data, that is connected to an output component that writes this data to the serial interface. If a data visualization component is added to the application, it can be placed in between the blob analysis and the output component. In addition, it has to be noted that input and output parameters can be used more than once. A frame grabber, for example, can pass the image to multiple components for image processing. Besides this, many components can be connected to a viewer, for example, to display data.

The first rule to select connections uses the category of the components. Based on general rules that describe which categories can be connected, the initial candidate connection list is determined. Rules used in this context would be, for example, that a viewer is connected to an input component, or an image inspection component is connected to a viewer. These global rules are available for the connector only and are typically not provided by the components. They represent general knowledge about components and applications. The rules can be loaded when the connector is invoked, can change during run time, and can be adapted, for example, depending on the field of application (e.g., industry or medicine), or the user.

In the next step, the data types of the input and output parameters are examined. All connection candidates that do not fulfill given type rules are removed from the list. Examples for these rules are, that a weaker type can be connected to a stronger type (e.g., an integer can be passed to a floating point value), or that equal types can be connected.

In the next step, the consistency of connections with the application are examined. This includes consistency of execution, data, and information flow. This is a global graph analysis which checks for cycles, which can lead to infinite loops or blocking. For this, each connection is treated as a directed arc and the components as the nodes of the corresponding graph. Using the input/output description of each component, the analysis is performed, based on standard graph analysis algorithms (e.g., as used for the analysis of Petri Nets). Each connection that does not generate a consistent application will be removed. This step guarantees that an application without problems like cycles is generated. This cannot be guaranteed with the standard approach, where the user has to connect the components with programming statements.

A special case are components which implement a specific graphical user interface of another component. These identify themselves unambiguously by their use (i.e., the component they belong to) and their identification.

If an unambiguous set of connections remains, the component is added to the application and the selected connections are established. In the case of ambiguities, further rules are applied to eliminate them. The rules can be used in combination or separately. Examples for these are: (i) locality: The distance of the positions, where the user placed the component on the desktop. Those, which are closer, have a higher probability to become connected; (ii) the order of selection: Those components, which are selected one after the other have a higher probability to be become connected; (iii) application area: The probability of being connected is based on the application area; (iv) user: The system asks the user which connection is preferred; (v) user profile: The system uses information about the decisions the user made in former sessions (learning).

If ambiguities remain, the component is added to the list of non-connected components.

A component can also be removed from an application. This can, for example, be done by the user by deleting the component. In this case all connections to and from this component are removed. After this, the remaining components might have to be reconfigured. In the case, that the removed component provided input for other components, these are reconnected, if possible.

Once the user has developed an application, and the components are connected, the information about the connections can be stored by the connector. This information can preferably be reloaded when the application is reactivated, either in design or user mode. By this, ambiguities can be minimized, even if the application is modified. From this, also general rules for the configuration can automatically be learned by the system. This can be accomplished using the learning methods known from artificial intelligence.

In view of the above, the following limitations of the known systems are removed according to the invention: The components are to be combined by adding programming statements to the application. These programming statements must include information as to how to pass data from one component to the other, and as to how to specify the order in which the components are executed; to make use of data, e.g., regions of interest, the user must add data components to the application and connect these to the other components by programming source code.

The present invention provides an architecture of object oriented components which fulfill the following requirements.

Each component comprises a description that specifies its behavior. This description is available in a form in which it can be processed by the component in all its modes of operation. It can consist of—but is not limited to—information about: number of input and output parameters; types of input and output parameters; category; name; description; assertions; and restrictions.

Furthermore, the selection of a component by the user invokes an automatic configuration process. This process can be controlled by a single component which has information about all other components or by any component based on the information provided by the component to be added to the application. The automatic configuration consists of the following steps:

(i) Connection of the components: Each component is connected to other components that either provide input data or require output data of the component. This connection can either be direct (component to component) or indirect (through a sequence of components).

(ii) Configuration of an execution method: The execution method determines information like
  the order in which the components are executed;
  the method how data is passed from one component to another;
  the data types that will be generated;
  the method how data will be accumulated during execution; and
  how long data must be stored and when it can be deleted.

The execution method comprises sub-methods which are used depending on the operation mode of the application, the interactions of the user, and the input of data. Sub-methods are, for example, be invoked by the availability of input data (e.g., acquisition trigger signals, image grabbing, or other input channels). In this case, all components that require this input data and their dependent components (i.e., components that require results of the component) will be executed. Furthermore, sub-methods are be invoked by the user interaction with the input data (e.g., the image). In this case, all components that can react on this kind of user interaction will be executed with the data which was manipulated together with the information of the interaction (e.g., mouse coordinates). A further example is the changes to the parameters of a component by the user. In this case the component—together with all its dependent components—is executed again.

Apart from this, the execution method preferably changes automatically depending on the operation mode. For example, in a configuration mode the calibration components will be executed and in an application mode components which adapt parameters according to changes of the input data will be executed. Furthermore, components can be executed in parallel.

(iii) Global communication between all components: Apart from the connection of components, which is needed to specify the execution order and the paths to pass data, a connection between components is established to pass information. This communication allows actions like passing information from one component to another (e.g., a component description or its status), sending messages between components (e.g., executing another component), displaying the results or the status of other components, and acting as a graphical user interface for another component.

(iv) Determination of the data that must be processed, i.e., the states that will occur in the design and user modes, the properties of the application, and the connections between the components. Based on this, an automatic process is invoked to store and reload all necessary data during design and user mode. This data comprises, but is not limited to, data which represents the look and feel of the user interface, the parameters of the components, or regions of interest.

The configuration process described above has the following properties. It can be executed repeatedly (reconfiguration), e.g., by introducing additional components to the application or by changing the status of the application. A change of the status can be invoked from the outside (by the user or by input of data) or internally by the system. Furthermore, both configuration and reconfiguration can be performed during design time and during program execution.

The following advantageous features are associated with the present invention:

No programming is required. This saves time and enables less skilled users to develop applications.

The execution method is automatically determined. This saves time and guarantees that no programming errors are introduced. Besides this, different execution methods can be used without extra programming effort. The multiple execution methods make the use of the application very intuitive, because the application automatically supports a standard execution method but can switch automatically to methods that handle user interactions. Furthermore, the system can inform the user whether a meaningful set of components has been selected, i.e., whether they can be connected to an application, or whether important components are missing.

The components of the invention automatically generate and manage the data that is processed. This saves time, guarantees that all needed data is available, and that no programming errors are introduced. In addition, it is very easy to change the number of used data (like regions of interest) because no reprogramming is required.

Data passing between the components is provided automatically. This saves time and guarantees that no programming errors are introduced.

Components can act as graphical user interfaces for other components. This enables an easy generation of those parts of the graphical user interface that are required.

A component can have multiple graphical user interfaces. This enables the user to develop an application, where the graphical user interface can be adapted optimally to the needs of the user, and as an extension to this, the application can dynamically change the graphical user interface to adapt itself to the requirements of its use.

The status of design and user mode are saved (and reloaded) with the same mechanisms. This enables the user to switch between the two modes (in both directions) without loosing state information. Furthermore, the state information can be exchanged if needed because it is stored independently of the application.

In the invention the user mode is subdivided into sub-modes. This allows to change the behavior of the application easily, by switching to the appropriate sub mode. Typical modes can, e.g., be supervisor mode (e.g., full access to all features of the application), configuration mode (e.g., access to all features which are needed to adapt the application to a new object that has to be measured), or application mode (executing the application with minimal interactions and feed back). This makes the application much more adequate for the requirements of the industry.

In the invention all components can be executed simultaneously in design mode. This allows a much easier testing of the application. Besides this, the confusing distinction between design and user mode is almost eliminated.

Furthermore, this allows to use fewer windows to display data: If only one component can be executed at a time, an additional display is necessary to display, e.g., the image and overlay the results, to check if the selected parameters are correct. In the invention, one display can be used for all components. This saves space on the screen and generates a much more consistent graphical user interface.

Each component contains a description that is sufficient to make full use of all features of the component. This is the basis for their use without the need of programming.

Each component automatically has access to all other components of the application. This allows, for example, to easily control the behavior of the application.

The invention uses data elements that combine the raw data with a description. This allows a much more flexible use of the data. For example, data passing to other components which need this data can be realized without having methods implemented for this specific data type.

In the following, the present invention will be described in more detail. Additionally, preferred embodiments are described which can be used in conjunction with the proposed system architecture.

Execution Modes

Standard systems based on object components distinguish between two operation modes: Design mode and user (execution) mode. In the design mode, the components are selected, programmed, and configured by the user. A (single) selected component can also be executed in design mode. Only in user mode, the complete application is executed. The present invention provides the following preferred improvements:

During the design mode, not only single components but the full application (all components) can be executed. This gives the user immediate feedback on the configuration process and therefore saves time during the development process.

The standard user mode is subdivided into multiple sub-modes. Depending on the sub-mode, the application changes its behavior and/or graphical user interface. Examples for user modes would be a configuration mode where parameters can be adapted, and application mode where only restricted changes of the application are allowed. These sub-modes can also be used, e.g., to automatically invoke calibration components in the configuration mode or adapt the user interface depending on the user level.

Automatic Save and Load Mechanism

The standard mechanism of component-based application development is to save the properties that are specified in the design mode and integrate them into the application code, where they no longer can be adapted and saved in the same way. If a system wants to save and reload values in the user mode, this must be implemented using a mechanism different from the one used in the design mode.

According to the invention, save and load mechanism does not distinguish between the design and the user mode. This has the following advantages. First, the system status can be stored and reloaded in both modes. Second, the mechanism is transparent for the user, i.e., he or she does not have to worry about the mode which is currently active. It always works in the same manner. Third, a status that is stored in the design mode is available in the user mode but also the other way around: If the user changes the status during execution and goes back to design mode the status will again be available. Fourth, because the status is not compiled into the application, it can easily be exchanged. This can be used, e.g., to offer a private status for each user.

Automatic Handling of Data Structures

The standard mechanism of handling data structures like images or regions of interest is to treat them as a component. This means that the user must apply programming to connect these data structures with the other components. In addition, the user either must know in advance how many data elements will be required during execution or the programming will become even more complex.

With the method of this invention, the components automatically generate and manage these data structures. The user does not need to worry about their number, their generation, or destruction. If needed, the data can also be saved and loaded automatically by the mechanism described above.

Passing Data between Components

The standard mechanisms to pass data between components have the following restrictions: The data is passed unidirectional, i.e., a component provides data that is used by another component, but results are not passed back. The second point concerns data descriptions and data handling. So far, data structures with predefined contents are used. This allows only a restricted flexibility when handling these data structures.

In the invention data can be passed in both directions, i.e., a caller provides input data for a component. In response, a component can pass data on to a successor or send data back to the caller. A component can also send data to another component that is not directly connected to it. These mechanisms allow, for example, to construct a view component which not only displays and manipulates images and the regions of interest but also overlays the results of (all) components, independent of whether the components are connected directly or not.

The present invention uses data elements which combine the raw data (like the image matrix) with an abstract data description. Examples for typical data are images, affine transformations, points, calibration data, strings, coordinates, features, measurements, or polygons. Data is always attributed with a description. The description is designed in a standardized way so that each component can interpret it. Methods to implement these descriptions can be found in the literature. The description is used to enable components to access the data they require. Besides this, data can be manipulated by components based only on this description. The data passed between components can be an (ordered) set of data elements. A component like a scheduler can, for example, check the type of the data that is available and pass it on to components that can process this data type (the information can be accessed through the description of the components). The data description can also be used during the configuration process (see connector) to check which parameters of components are compatible with respect to the data types.

Furthermore, the use of (ordered) sets of data leads to an easy way to aggregate data. For example, data that is provided by a change detector, like an affine transformation, can be added to the regions of interest to correct their position, orientation, and size. This data can be passed on by all components, independent of whether they need it or not. Each component can request the data and access it if it is available. On the other hand, all components can pass this data on, independent of whether this specific data was known when the component was implemented.

Multiple Graphical User Interfaces

The standard mechanism in component-based application development is that a component has a given graphical user interface which can be configured in design mode.

According to the present invention, a component preferably has multiple user interfaces. These are selected depending on, e.g., the needs of the user. This offers two possibilities for the user. In the most simple case, an interface is selected that best fits the needs of a specific group of users. An image processing expert wants, for example, full access over all parameters. For more complex applications, multiple graphical user interfaces must be integrated into one program. An experienced user will need access to the image processing parameters during system setup. When the application is running in the "every day mode", only one button for start and stop and a red or green "light" for the system status might be needed. The application can, for example, be generated by activating the different sub-modes in the design mode. Depending on the mode, the graphical user interface will be configured. In the user mode, only the sub-mode has to be activated to switch between the different user interfaces.

The present invention will be explained in further detail below while referring to the drawings, wherein.

Figure 1:
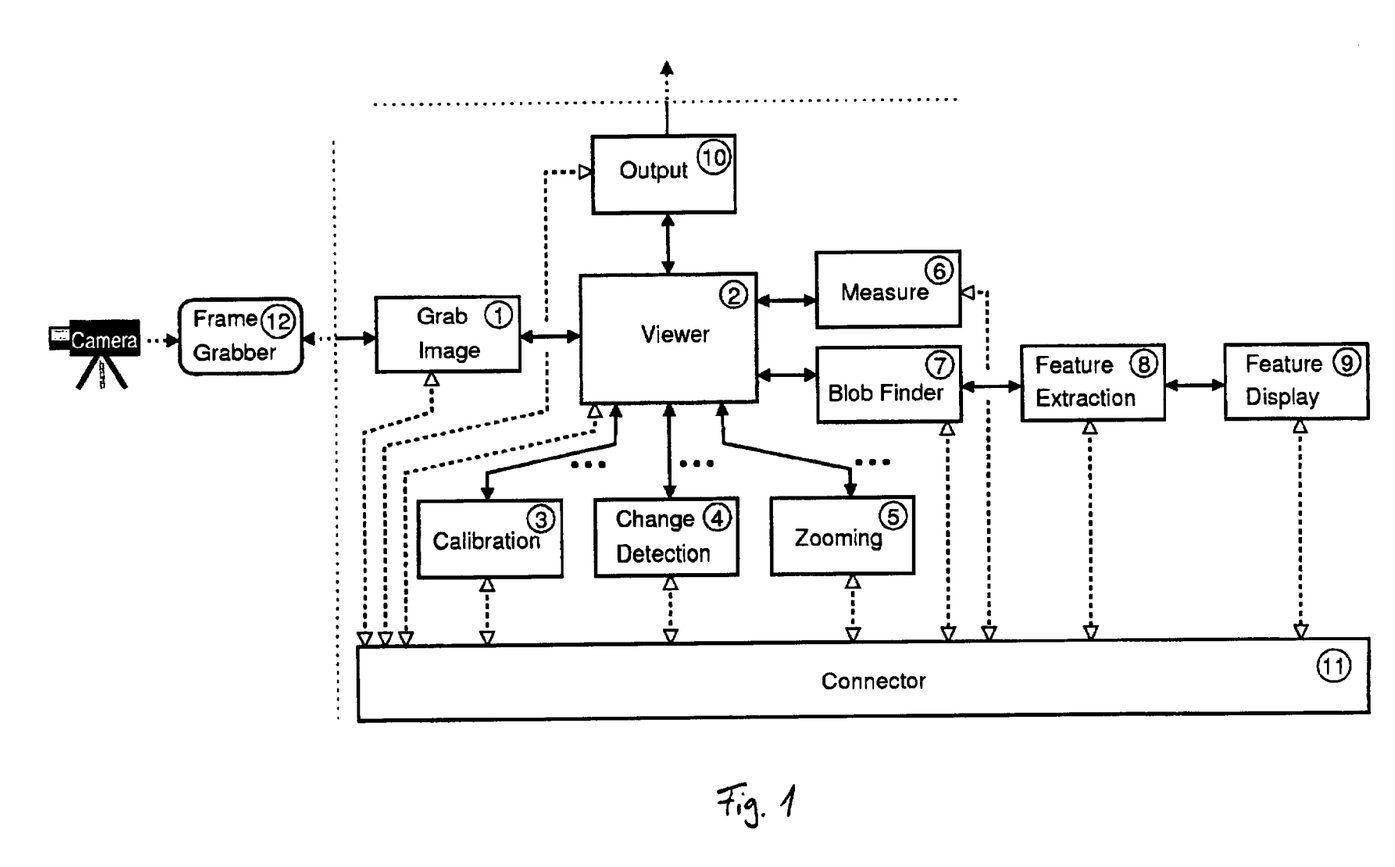
FIG. 1 shows a block diagram of an embodiment of the invention.

The embodiment of FIG. 1 consists of a unit to input the image by means of the frame grabber 12 and the grab image component 1. This image is connected to the viewer 2 which displays the image, and overlays regions of interest and results of the image processing components. Besides this, it manages the data, and passes it on to the other components. Directly connected to the viewer 2 are a calibration component 3, a change detection component 4, and a zooming component 5. The image processing part consists of two sequences. The first one consists of only one component, i.e., a measure component 6. The other one is a blob finder 7, connected to a feature extraction component 8, which is connected to a feature display component 9. The results of both image processing parts are output by the output component 10. A connector 11 performs the connection control between the various activated components.

In this embodiment, the connector 11 is provided for automatically establishing connections between the components selected by the user.

Displaying Data and User Interaction

The system according to the present invention has at least one special component (i.e., the viewer) that has three major tasks.

The first task is to display input data like images, and to display the results of other components. These results are typically derived from the input data. Whenever a new image is grabbed, it will be displayed in the viewer 2. Then the image is passed to the image processing components. Data they extract in the image (like edges, lines, coordinates, distances, or polygons) is passed back to the viewer 2, which overlays this data on the image, with the visualization depending on the type of the data. The advantage of this feature is that only one display is required for images and results, which saves space on the screen. Besides this, the graphical user interface becomes more intuitive and the information can be perceived faster, because corresponding data is presented together.

The second task of the viewer 2 is to control other components. Based on the descriptions of the other components used in the application, the viewer 2 can act as a global control unit. It accesses information like the component names, supported type of region of interest, or data types that can be processed. Based on this information, it can automatically generate a graphical user interface. To control general properties of other components, the user only needs to interact with this graphical user interface. Based on these interactions, the viewer 2 sends messages to the corresponding component.

The third task of the viewer is to provide other components with additional data like regions of interest: Based on the type information, the viewer knows about the kind of input data that other components can process. This is used to generate regions of interest that fit to a component. These regions of interest can be manipulated in the graphics window of the viewer by overlaying them on the image data and modify or generate them using, e.g., mouse interactions. When a component is executed the corresponding regions of interest are combined with the image and passed as input.

Categories of Components

Depending on the tasks and the behavior of a component, it is assigned to a category. Therefore, a category is a set of components that have a similar behavior. A category is used, e.g., to generate the execution method for the application, or to connect components. In the following, examples for categories and the corresponding tasks are given:

Viewer: Displays input data and overlays it with regions of interest and results of other components.

Meta components: Display the overall structure of the application, display the control flow statically, and, during execution, display used resources and execution time.

Input: Input of image data and data from other sources like serial interface or digital I/O.

Output: Output results of the process to devices like files, serial I/O, or buses.

Calibration: Calibration of the vision system and the input devices, like geometric calibration or radiometric calibration.

Change detection: Changes in the input data (like illumination or positions of reference objects) are detected and the change information is passed on to other components.

Inspection: These components are used to extract information from the input data like images. This can, for example, be zooming, histogram, noise level, illumination, contrast, or sharpness.

Authentication: The user who wants to use the application has to identify himself. Based on this information, the application can deny the use, change its behavior, change the graphical user interface, or select the user mode.

Graphical user interface: A component can simply be a graphical user interface that is used in combination with another component which does the data processing. Such a component allows the (partial) control of the functionality of the component. A component preferably has multiple user interface components which can be selected, e.g., depending on the user, or the user mode.

Image processing: The components have iconic data as input (e.g., images, regions, or polygons) and output iconic and/or numerical data.

Data processing: These components process general data like the result of a feature extraction or the input of a serial interface.

Execution Methods

The execution of the application has three methods—but is not restricted to three—which are triggered by the interactions of the user or input from other devices; (i) driven by input data (e.g., external trigger, image grabbing, or other input channels): In this case, all components that require this data will be executed. This is done to execute all components according to an automatically generated schedule. This sequence of executions can either be passive (triggered from the input) or active (requesting data, e.g., from the frame grabber); (ii) user interaction with the input data (e.g., the image): In this case, all components, that can react on this kind of user interaction will be executed with the data, that was manipulated together with the information of the interaction. As an example, the user moves the mouse in the graphics window of the viewer, that displays an image. This interaction results in the execution of all components, that can process images in combination with a point (e.g., a component for zooming); and (iii) the user changes the status (parameters) of a component: In this case the component—together with all its dependent components—is executed again. If the user changes, e.g., a threshold of the blob analysis, the scheduler will execute the blob analysis, that then generates a new segmentation which can be overlaid on the corresponding image in the viewer.

Before the standard execution method will be described, the purpose and function of the scheduler is explained.

The scheduler is that part of the invention which specifies the order of the execution, manages the data, passes the data between the components, and executes the components.

There are three major ways to implement the scheduler:

The scheduler is a component which is connected to all other components. By using the mechanism for component communication, proposed by the invention, e.g., execution of the components and transfer of data, this component implements the features of the scheduler.

The scheduler is a software module like the connector. This module is connected to the components when they connect to the connector. Based on these connections, the scheduler can realize the features of the scheduler. With this implementation, the user does not have to add a scheduler component to the application, which makes the use of the system easier. In this case, the scheduler would be linked (in terms of compiler technology) to the connector.

The scheduler is described among the components. The functionality specific for a component is part of the component. This can be implemented by offering a library which is used when a component is implemented. This approach is slightly faster than the other two because less communication is required. It is the implementation used in a preferred embodiment of the invention.

The standard execution method corresponds to the first of the above described method. It is based on a set of rules that are applied to all components in a given order. The user does not have to worry about this configuration process.

Main loop: The scheduler executes the components in a given order. It starts with the components that input data (e.g., grab an image). Whenever these components provide new data, all directly and indirectly dependent components are executed. Once through the sequence, the process starts from beginning. This restart can be invoked either by an external event, like a trigger signal or by actively requesting the data. In both cases, the system has to wait until the data is available to restart the standard execution sequence. Whenever there are interactions caused, for example, by the user, the system can switch to one of the two other execution methods described above. This switch can happen, when the system reaches the end of an execution sequence. This ensure that only consistent results are calculated.

Input of data: The first action is to grab the image or access other external data. This input can be invoked actively, or by an external signal. In FIG. 1, component 1 is executed.

Displaying: Depending on the sub-mode and used properties, the image will be displayed. Optionally, it can be overlaid with regions of interests or the other (input) data. In FIG. 1, component 2 (viewer) is executed.

Primary vision loop: Depending on the execution sub-mode, specific preprocessing components are executed.

Inspection: These components can be used in all sub-modes. In FIG. 1, this corresponds to component 5 (zooming).

Calibration: These components are used in the configuration mode. When they are executed, they return data that must be stored to be used later in the application mode. It will be added to the input data to enable the vision components to calibrate the results and to increase their accuracy. In FIG. 1, this corresponds to component 3.

Change detection: In the application mode, these components return data that will be added to the image by the display to enable the vision components to compensate these changes. In FIG. 1, this corresponds to component 4.

Vision loop: The scheduler combines the data from the primary components (e.g., calibration data 3 or change detection 4) with the image. Then a loop for all connected vision components is started. This means that each directly connected vision component is provided with information and then started. As a consequence, all successors of the component will also be executed. For each directly connected vision component the scheduler has a list of regions of interest. This list is also added to the image data.

Execution: The compound image data is passed to the vision component and then executed.

Successor: In the case that a component has a successor, it will pass its input data, combined with its results, on to the successor, and executes it.

If necessary, the component can modify the input data before it is passed on to the successor. This process is repeated until all successors are executed.

Vision results: Whenever a component calculates results, they can be passed back to the viewer, where they can be overlaid with the image and other data displayed so far. This way of displaying results works independently of the component being directly connected or not.

Non-iconic results: Data like areas, distances, or text is also passed back to the scheduler. Here, it can be collected until all results are available.

Control messages: It might be necessary that a component controls hardware, e.g., a frame grabber. In this case, the component can send a message that generates the desired action back to the scheduler.

In FIG. 1, two sequences are available. The first sequence consists only of the measure component 6. This is executed first. The results of the measurement are passed back to the viewer 2. The second sequence consists of components 7, 8, and 9. They are executed in this order. The results are passed back to the viewer 2 by the last component 9, i.e., feature display of the sequence.

Output: After all vision components are executed the result data is available at the viewer 2. Therefore, it is passed on to all connected output components. In FIG. 1, one output component 10 is connected.

With an execution caused by interaction, there are two ways, by which the user can influence the execution method. According to the first way, the user interacts with the data visible in the viewer: In case the user points or clicks on input data like an image, the viewer collects these events as long as the execution is in the standard execution method. When the scheduler finishes the standard execution sequence, the interactions are examined, and, e.g., duplicates eliminated. Then, all components that can process this kind of data are executed with the data currently available, combined with the mouse positions and button press data. After that, the scheduler can proceed with the standard execution method. In FIG. 1, one component that can process mouse interaction is connected, namely zooming component 5. It will be executed in this case.

Alternatively, the user interacts with any component, for example, by changing image processing parameters. Whenever this happens, the component informs the scheduler that the component has to be re-executed. The scheduler holds a list of the components that have sent this request. When the standard execution sequence is finished, this list is processed. This means that all sub-sequences that contain a component of the list are re-executed. As an example, the user interacts with the blob finder 7 in FIG. 1. This results in a re-execution of the components 7, 8, and 9.

Depending on the application, the execution methods described above are only preferably used. They are not necessary, for example, for applications that are time critical. Furthermore, it is possible to process the components with new data, for example, from the frame grabber, instead of using the old data.

Now, implementation details are described. To avoid errors when programming a new component and to ease the task of development a new component, the following rules can be applied. First, a root class, which implements basic data structures and methods that are common to all components, is used. This class is used as an interface for all components. This guarantees that all components have the same basic functionality. The root class can implement all the functionality that are common to the components of the invention. Besides this, one class for each category that is derived from the root class is implemented. These classes implement data structures and methods that are specific for the categories. These classes are used as an interface for the components belonging to a specific category. Finally, each component is derived from the class of one category. This guarantees that a component implements all features that components have in common and besides this have the specific features of the category.

With respect to load/save in design and user mode, the following should be noted: When a component is invoked for the first time during a session—independent if this happens in design or user mode—the state of this component, in the context of the application, is loaded. If no state information for the component in combination with the application is available, the default value will be returned.

When the component is destroyed, for example, at the end of the execution or at the end of the design time, its status is saved. The data is stored in the context of the application. This means that the state information of an application is defined as the set of states of the components belonging to it. The state information of an application can, for example, be stored in a file or the registry of the operating system.

EXAMPLE

The following example describes the development of a typical application that grabs the images from the camera, displays these images in a viewer, checks for bar codes in the image, reads the codes, and passes the results to a serial interface. In addition, an online zooming is added to inspect the images.

Starting the Development Environment

Figure 2:
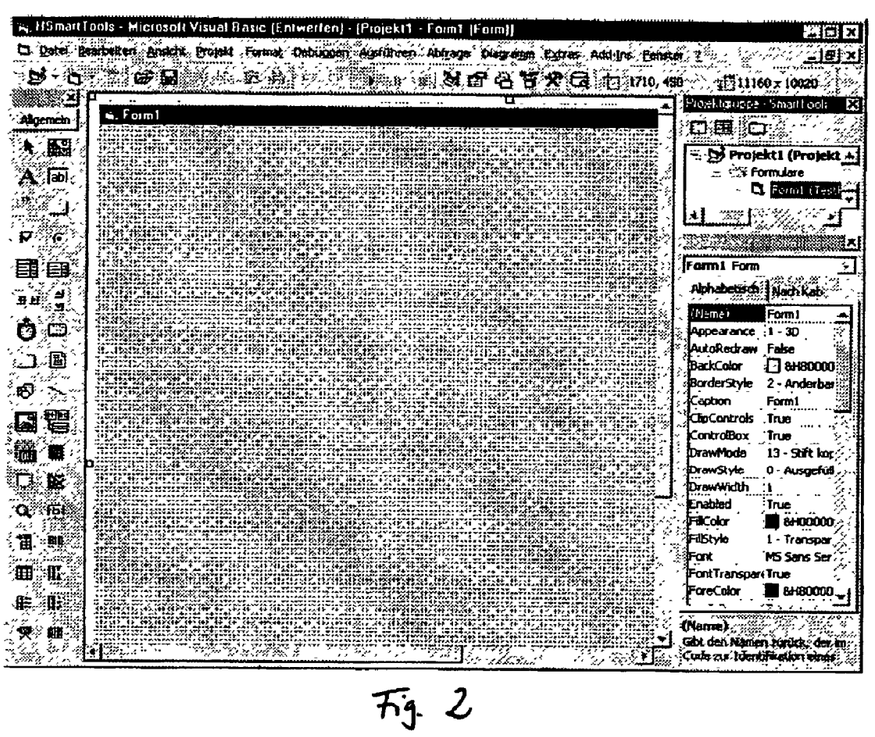
FIG. 2 shows an example after the activation of the components (lower left side)

The examples assumes that Microsoft Visual Basic is used to develop the application. Therefore, this environment is started by the user and "Standard-EXE" is selected. After this, the user selects the dialog "Components" in the menu "Project" to activate the components of the invention. After the activation for each component, an icon is displayed in the component selection. Now the user can start the development of the application. FIG. 2 shows Visual Basic after the activation of the components (lower left side). The area in the middle "(Form 1)" is used to place the components of the application.

Selection of Viewer

As a first step, the user double-clicks the icon of the viewer. This generates an instance of this component which is automatically placed into the form of the application that is being developed (see FIG. 3). The size, the position, and other properties of the viewer can be changed by the user. This can be done by manipulating the viewer with the mouse (e.g., position and size) or by changing the properties directly (e.g., by using the property page at the lower right side of the window).

Figure 3:
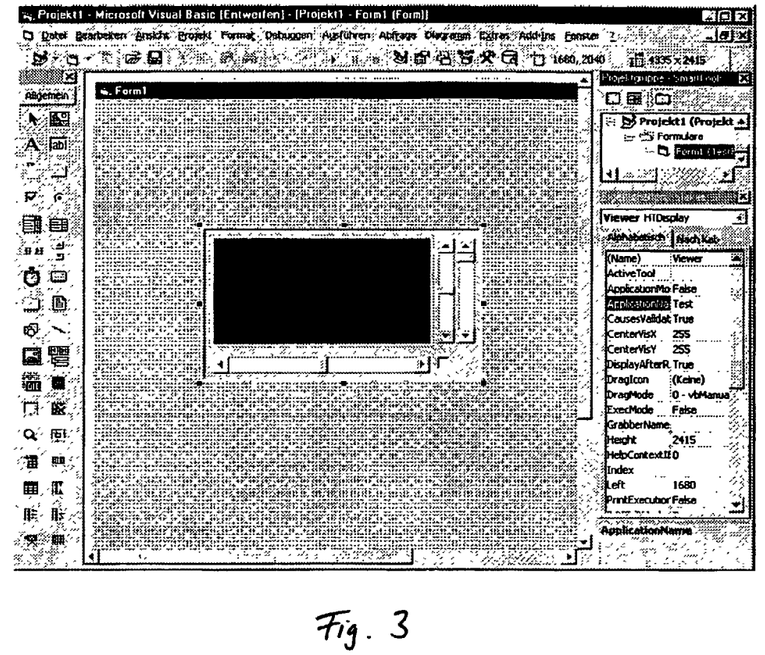
FIG. 3 shows the example of FIG. 2 after the selection of a viewer.

When the viewer 2 is placed on the form ("Form 1"), the initialization routine of the component is executed and after this the component is drawn on the form. During the initialization routine, the component calls the registration routine of the connector 11. It passes a reference to itself as a parameter to the connector. Because the connector 11 is called for the first time, it initializes its data structures. Using the reference to the component, the connector can access the description of the component. It first checks whether the component is an input component. Because the viewer 2 is not an input component, it will be put into the list of not connected components. The list of connected components remains empty. Therefore, the single viewer component does not implement an application.

Whenever the user interacts with the component (by using the mouse or by changing the properties) the corresponding routine of the component is executed.

Selection of Frame Grabber Component

As the next step of this example, the user selects the frame grabber component 12 by double clicking its icon. As a result, the component is placed on the form. Like with the viewer 2, the user adapts the size, the position and other properties interactively. The result of these actions can be seen in FIG. 4.

Figure 4:
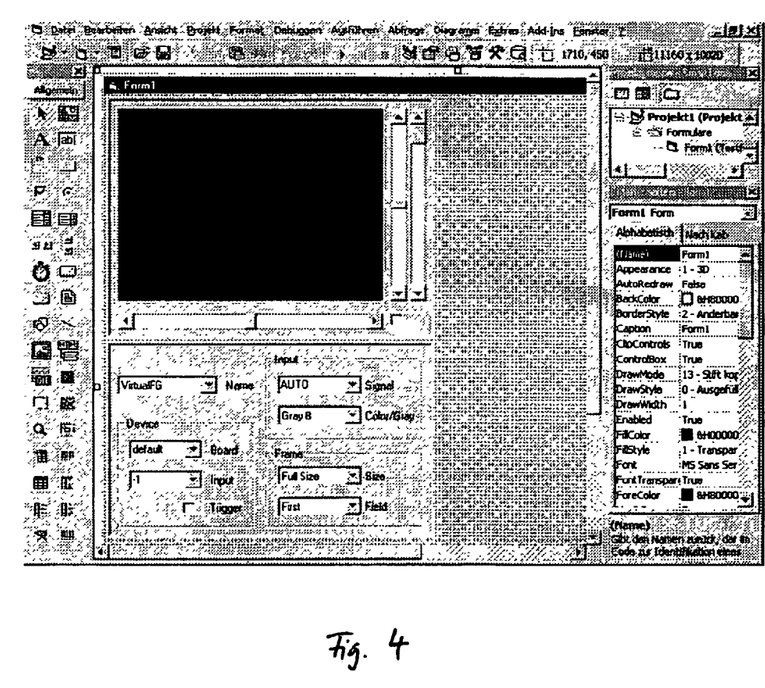
FIG. 4 shows the example of FIG. 3 after the selection of frame grabber component.

When the frame grabber component 1 is placed on the form it calls the connector 11 (like the viewer 2). By passing a reference to itself to the connector, the automatic connection process is invoked. The connector first checks for the category of the component. Because this category is "input", the frame grabber 1 becomes the first component of the application. So far the component has no connections. As the second step, the connector reexamines the components in the list of not connected components. Here, only one component is available: the viewer. Now all rules for connecting parameters are tested. In this case the frame grabber is connected to the viewer because:

input components can be connected to view components,
the output type of the frame grabber is "image", and
the input type of the viewer is "image".

Therefore, the frame grabber 12 is connected to the viewer 2 and also the viewer 2 is connected to the frame grabber 12 This means that both components get a reference to the other component. Using this reference, they can exchange data and call routines of each other.

Execution in Design Mode:

In order to execute the application in the design mode the user clicks with the right mouse button on the frame grabber. This creates a pop-up menu where the last entry ("Edit") is selected. This enables the user to use the graphical entities (buttons, option menus, etc.) of the component. Using these, the user selects the appropriate frame grabber and its parameters and switches it online.

Figure 5:
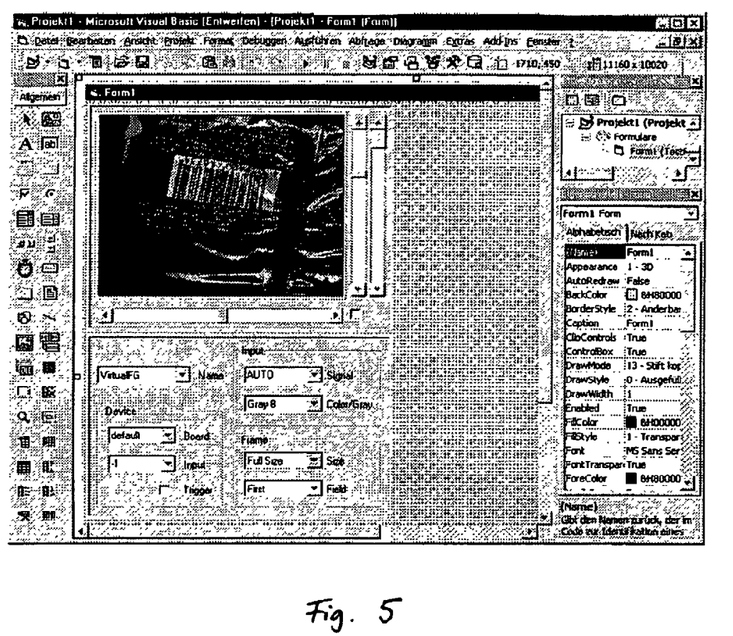
FIG. 5 shows the example of FIG. 4 with the viewer with the online image.

When the user activates the component using the pop-up menu, all its data structures and routines become active, i.e., everything can be executed when it is invoked by interactions of the user. When the user changes the parameters of the frame grabber it accesses the signal from the camera. This generates an image in the frame grabber component. Because the frame grabber is connected to the viewer (as a data source) it will pass this image to the viewer. This activates the viewer and the viewer displays the image. As long as the frame grabber remains active, it generates images, which are passed on to the viewer and displayed there. The effect for the user is the online image in the viewer can be seen and the frame grabber parameters are edited in the frame grabber component. FIG. 5 shows the viewer with the online image.

Selection of the Online Zooming Component

To inspect the quality of the image, the user adds an online zooming component 5. The actions are the same as those of the previous two components.

The zooming component is then connected to the viewer because the category of the zooming component is "inspection", inspection components can be connected to view components, the input data type of the zooming component is "image", and the viewer provides the output data type "image".

The user then activates the viewer. When s the mouse is moved in the display, the zooming component displays the part of the image in which the mouse is located. As regards the system, two actions are important for the online zooming: Whenever an image is passed to the viewer (from the frame grabber), it will automatically be passed on to the zooming component. Furthermore, if the user interacts with the mouse in the display of the viewer, the zooming component will be called with the image and the mouse coordinates.

Figure 6:
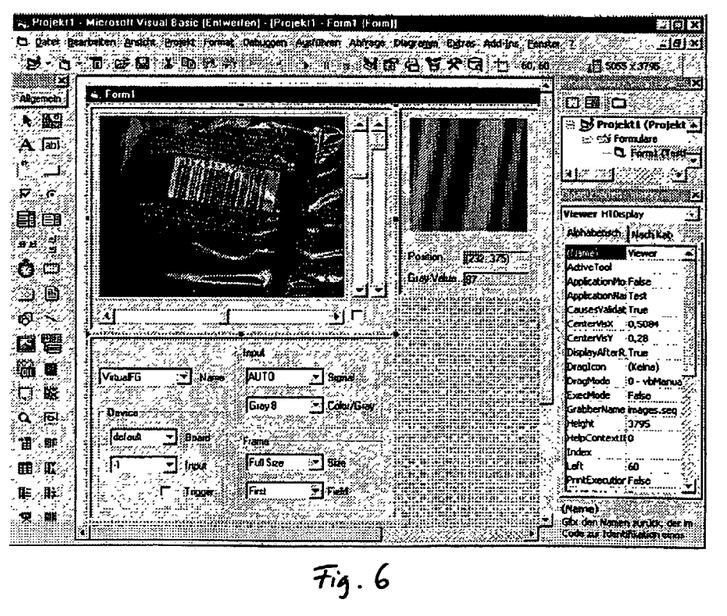
FIG. 6 shows the result of placing the zooming component onto the form of the example shown in FIG. 5.

FIG. 6 shows the result of placing the zooming component onto the form. Besides this, the effect of moving the mouse in the viewer is visible.

Execution in User Mode

Figure 7:
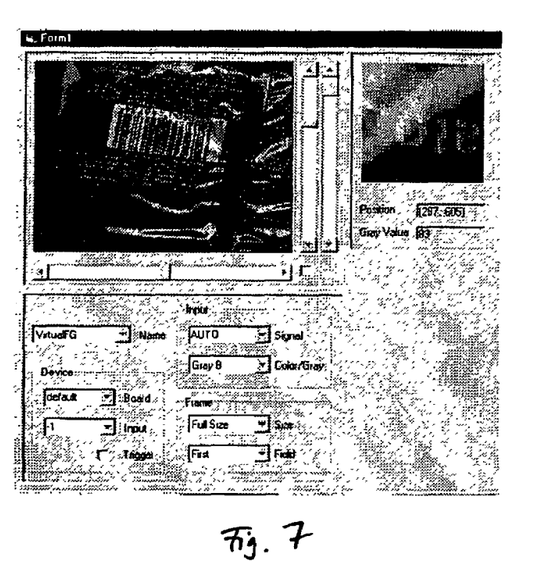
FIG. 7 shows the application in user mode.

FIG. 7 shows the application in user mode. The user presses the run button of the Visual Basic environment to execute the application in user mode. This starts the program as a stand-alone application. The user can interact with it in the normal way (editing frame grabber parameters, displaying the image in the online zooming component). Finally, the user stops the application and returns to the design mode. Changes applied to the application in the user are again available in the design mode.

When the user presses the run button, all components of the application are destroyed. Before this happens they save their state information (like parameter settings) in a special state file. After this, Visual Basic creates an executable file that is executed. When this happens, all components are created anew and are placed at their corresponding positions. After this, the components read their state information from the file and reconfigure themselves accordingly. Then, all components call the connector to generate the same connections that were used in the design mode. Finally, the application waits for the input of the user. When the user switches the frame grabber on, the system runs with the default execution mechanism: The frame grabber component waits for an image, passes it on to the viewer, which displays it and passes it on to the zooming component. Whenever the user moves the mouse in the display of the viewer, this generates an extra call to the zooming with the mouse coordinate.

When the user stops the application, all components are destroyed. Before that, the components save their state information in the state file.

When Visual Basic returns to the design mode, the components are generated anew, their state information is reloaded and the components are re-connected.

FIG. 7 shows the application in user mode.

Selection of Bar Code Component

Figure 8:
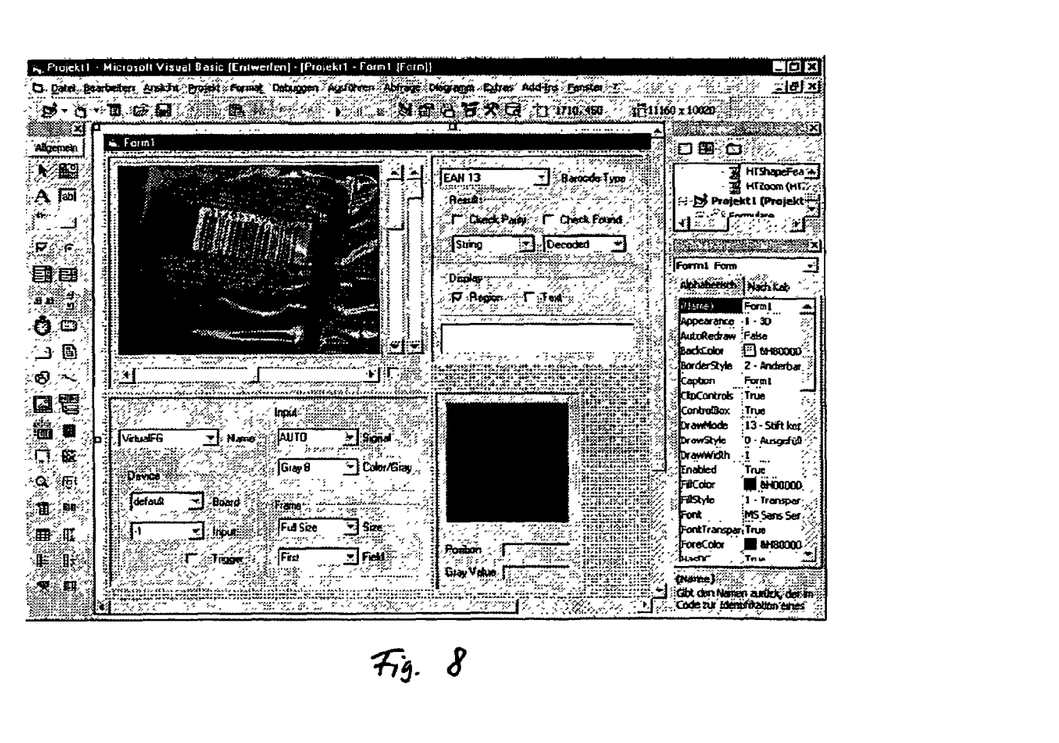
FIG. 8 shows the result of selecting the bar code reader.

To complete the application, the user adds a bar code reader to it. FIG. 8 shows the result of selecting the bar code reader. When the component is selected and generated, it is connected to the application. The following rules are used:

The bar code reader is a vision component
Vision components can be connected to a viewer
The input type of a bar code reader is "image"
The viewer has an output for images Defining a Region of Interest Finally, a graphical component is added to the application to create and edit regions of interest. The region of interest component is connected to the viewer, because:

The category of the component is "graphical user interface component" and it can be connected to the viewer After the component is connected, the viewer provides information about all components that depend on the viewer to the new component. From this information, the following is selected:

Names of the connected components
Type of the regions of interest that are supported
Maximum number of regions of interest Using this information, the dialog is configured accordingly.

Execution in User Mode

In order to execute the application in user mode, the user presses the run button. In user mode, the region of interest for the barcode reader is specified. By doing this, the application is automatically executed and the bar code reader is executed with the specified region of interest. When the user changes parameters of the barcode reader, the component will be re-executed with the new parameters. When the frame grabber provides new images, the viewer displays the image and executes the zooming and the bar code component.

When the status changes from design to user mode—and vice versa—the same mechanism described above is executed.

When the user selects a component in the region of interest component, the types of regions of interest that are supported by the component can be selected. By choosing one of these, the user can interactively generate a region of interest in the viewer. This region of interest is stored with the viewer, together with the information about the component it belongs to. Whenever the component is executed, in the given example the bar code reader, the region of interest will be combined with the image automatically when the image is passed to the component.

Figure 9:
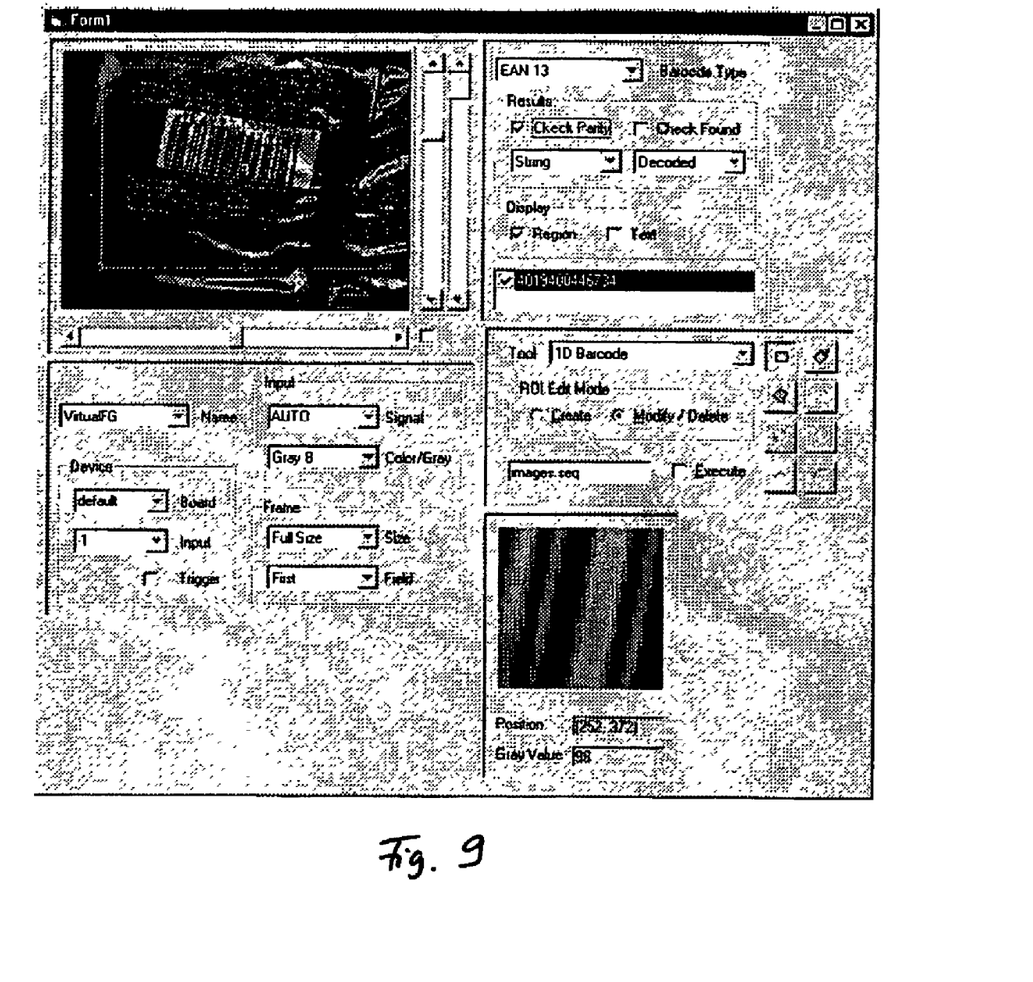
FIG. 9 shows the application in user mode.

FIG. 9 shows the application in user mode. In the region of interest component (left center) the component "1D Barcode" and a rectangular region of interest type is selected. The generated region of interest is visible as, e.g., a red rectangle in the viewer. In the bar code component (upper left) the result of the decoding is displayed. The region corresponding to the code is displayed as, e.g., a blue border in the viewer. This is accomplished by passing the segmentation result back to the viewer and overlaying it to the image.

Saving the Application

When the user returns to design mode, he/she can generate a stand alone application using standard Visual Basic mechanisms. This generates an "exe"-file and a file that contains the state information.

Although various embodiments that incorporate the teachings of the present invention have been shown and described in detail herein, those skilled in the art can readily devise many other varied embodiments that still incorporate these teachings. For example, one embodiment of the invention is implemented as a program product for use with a computer system such as, for example, the system shown in FIG. 1. The program(s) of the program product defines functions of the preferred embodiment and can be contained on a variety of signal-bearing media, which include, but are not limited to, (i) information permanently stored on non-writable storage media, (e.g., read-only memory devices within a computer such as CD-ROM disks readable by a CD-ROM drive); or (ii) alterable information stored on writable storage media (e.g., floppy disks within a diskette drive or hard-disk drive). Such signal-bearing media, when carrying computer-readable instructions that direct the functions of the present invention, represent embodiments of the present invention for performing a method for developing image processing applications as described hereinabove.

The invention claimed is:

1. A method for developing image processing applications, comprising the steps of:
    (a) providing a plurality of application components (1 to 10) by a user;
    (b) providing a connector means (11) for establishing connections between components selected from said plurality of application components, wherein said plurality of application components include viewer components, change detection components, data processing components, image processing components, and calibration components; and
    (c) automatically connecting said selected components to each other using the connector means (11) to generate said image processing application.

2. The method of claim 1, further comprising between steps (b) and (c) the step of automatically connecting said selected components to said connector means (11).

3. The method according to claim 1, wherein step (c) the automatic connection of the selected components is based on information provided by the respective components.

4. The method according to claim 1, wherein the connector means (11) initializes its data structure when being activated for the first time.

5. The method according to claim 1, wherein the connector means (11) registers said selected components (1 to 10).

6. The method according to claim 5, wherein said selected components are registered by said connector means (11) in at least two groups dependent on the ability of each selected component of being connectable to other selected components or not.

7. The method according to claim 1, wherein each selected component passes a reference or pointer to the connector means (11) and/or its description to said connector means (11).

8. The method according to claim 1, wherein the first selected component is used as the initial component if it is an input component, or otherwise added to a list of not-connected components.

9. The method of claim 8, further comprising the steps of:
    checking each subsequent component with available parameter of the prior selected components according to a set of evaluation rules, and adding it to a candidate connection list if a connection fulfills said evaluation rules;
    examining data types of input and output parameters of said selected component;
    examining consistency of connections with the image processing application;
    adding the component to the image processing application; and
    establishing the selected connections.

10. The method of claim 9, wherein said evaluation rules comprise a graph analysis to determine consistency and to avoid deadlocks during application execution.

11. The method according to claim 9, wherein said evaluation rules utilize the category of components, locality, order of selection, application area, user, and user profile for establishing a connection.

12. The method according to claim 1, wherein said connector means (11) saves information about the current components and their connections before being unloaded.

13. The method according to claim 12, wherein said information is reloadable when reactivating the image processing application.

14. The method according to claim 1, wherein at least one component (1 to 10) comprises a description specifying its behavior, said description comprising information selected from the group comprising number of input and output parameters, types of input and output parameters, category, name, description, assertions, and restrictions.

15. The method according to claim 1, wherein said selected components are simultaneously executable in the design mode.

16. The method according to claim 1, wherein the system status is storable and reloadable in design mode and/or user mode, whereas whatever was stored in design mode is reloadable in user mode and vice versa.

17. The method according to claim 1, wherein data structures of the image processing application are automatically generated and managed.

18. The method according to claim 1, wherein data is passed between components in both directions.

19. The method according to claim 1, wherein a component sends data to a component not directly connected therewith.

20. The method according to claim 1, wherein at least one component has multiple user interfaces.

21. The method according to claim 1, further comprising the steps of:

connecting the selected components (1 to 10) for passing data;
configuring an execution method;
establishing global communication between all selected components for passing information; and
determining data to be processed.

22. A system for developing image processing applications, the system comprising:
a plurality of application components (1 to 10) provided by a user, each of said application components having coding for establishing connections therebetween; and
a computer device operable to
provide a connector means (11) for establishing connections between components selected from said plurality of application components, wherein said plurality of application components include viewer components, change detection components, data processing components, image processing components, and calibration components; and
automatically connect said selected components to each other using the connector means (11) to generate said image processing application.

23. A system for developing image processing applications, comprising:
a plurality of application components (1 to 10); and
connector means (11) for establishing connections between components selected from said plurality of application components by a user, wherein said plurality of application components include viewer components, change detection components, data processing components, image processing components, and calibration components, and
wherein said connecting means automatically connects said selected components.

* * * * *